(12) United States Patent
Yu et al.

(10) Patent No.: US 10,613,272 B2
(45) Date of Patent: Apr. 7, 2020

(54) LIQUID CRYSTAL DISPLAY DEVICE AND METHOD FOR MANUFACTURING LGP POSITIONING BLOCK THEREOF

(71) Applicant: Shenzhen China Star Optoelectronics Technology Co., Ltd., Shenzhen, Guangdong (CN)

(72) Inventors: Gang Yu, Guangdong (CN); Dehua Li, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 306 days.

(21) Appl. No.: 15/607,575

(22) Filed: May 29, 2017

(65) Prior Publication Data

US 2017/0261683 A1    Sep. 14, 2017

Related U.S. Application Data

(62) Division of application No. 14/429,067, filed on Mar. 18, 2015, now Pat. No. 9,726,814.

(30) Foreign Application Priority Data

Dec. 30, 2014   (CN) .......................... 2014 1 0842588

(51) Int. Cl.
| F21V 8/00 | (2006.01) |
| G02F 1/1333 | (2006.01) |
| F21V 17/10 | (2006.01) |
| G02B 6/00 | (2006.01) |
| G02F 1/1335 | (2006.01) |

(52) U.S. Cl.
CPC ............ *G02B 6/0088* (2013.01); *F21V 17/10* (2013.01); *G02B 6/00* (2013.01); *G02B 6/0065* (2013.01); *G02B 6/0073* (2013.01); *G02F 1/133308* (2013.01); *G02F 1/133615* (2013.01); *G02F 2001/133322* (2013.01); *G02F 2203/60* (2013.01)

(58) Field of Classification Search
CPC ...... G02B 6/0088; G02B 6/0065; G02B 6/00; G02B 6/0073; G02F 1/133308; G02F 2203/60; G02F 2001/133322; G02F 1/133615; F21V 17/10
See application file for complete search history.

(56) References Cited

U.S. PATENT DOCUMENTS 10,247,878 B2 *   4/2019   Yu ........................... F21V 17/10

* cited by examiner

*Primary Examiner* — John C Hong
(74) *Attorney, Agent, or Firm* — Andrew C. Cheng

(57) ABSTRACT

A method for manufacturing a light guide plate (LGP) positioning block thereof includes providing a positioning block body of a LGP positioning block and filling and sealing a liquid in a receiving compartment formed in the interior of the positioning block body. The liquid is expandable with a drop of temperature so as to increase a volume thereof and thus enlarge a size of the positioning block body through elasticity of the positioning block body. In this way, the LGP positioning block is adjustable with the variation of the surrounding temperature so as to achieve effective positioning of the light guide plate and providing high reliability of a liquid crystal display device including the light guide plate.

8 Claims, 7 Drawing Sheets

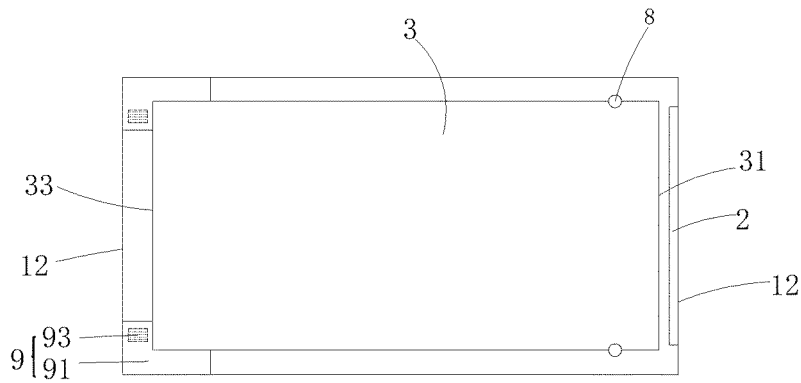

Fig. 8

Step 1: providing a positioning block body (91); wherein the positioning block body (91) possesses elasticity and comprises a sealing trough (912) formed by recessing a top surface thereof, a passageway (913) in communication with the sealing trough (912) and extending into the interior of the positioning block body (91), and a receiving compartment (914) in communication with the passageway (913) and formed in the interior of the positioning block body (91);

Step 2: providing liquid (93) and filling the liquid (93) in the passageway (913) and the receiving compartment (914);

Step 3: applying sealing adhesive (915) in the sealing trough (912);

Step 4: leveling and solidifying the sealing adhesive (915) so that the sealing adhesive (915) seals the liquid (93) in the positioning block body (91) to thereby complete the manufacture of the LGP positioning block (9).

Fig. 9

LIQUID CRYSTAL DISPLAY DEVICE AND METHOD FOR MANUFACTURING LGP POSITIONING BLOCK THEREOF

CROSS REFERENCE TO RELATED APPLICATIONS

This is a divisional application of co-pending patent application Ser. No. 14/429,067, filed on Mar. 18, 2015, which is a national stage of PCT Application Number PCT/CN2015/072561, filed on Feb. 9, 2015, claiming foreign priority of Chinese Patent Application Number 201410842588.5, filed on Dec. 30, 2014.

BACKGROUND OF THE INVENTION

1. Field of the Invention

The present invention relates to the field of displaying technology, and in particular to a liquid crystal display device and a method for manufacturing a light guide plate (LGP) positioning block thereof.

2. The Related Arts

Liquid crystal displays (LCDs) have a variety of advantages, such as thin device body, low power consumption, and being free of radiation, and are thus used widely, such as mobile phones, personal digital assistants (PDAs), digital cameras, computer monitors, and notebook computer screens.

Most of the LCDs that are currently available in the market are backlighting LCDs, which comprise an enclosure, a liquid crystal panel arranged in the enclosure, and a backlight module mounted in the enclosure. Since the liquid crystal panel is not self-luminous, light supplied from the backlight module is necessary for normally displaying an image. Thus, the backlight module is one of the key components of a liquid crystal display. The backlight modules can be classified as a side-edge backlight module and a direct backlight module, according to the site where light gets incident. The direct backlight module comprises a light source, such as a cold cathode fluorescent lamp (CCFL) or a light-emitting diode (LED), which is arranged at the backside of the liquid crystal panel to directly form a planar light source supplied to the liquid crystal panel. The side-edge backlight module comprises an LED light bar, serving as a backlight source, which is arranged at an edge of a backplane to be located rearward of one side of the liquid crystal panel. The LED light bar emits light that enters a light guide plate (LGP) through a light incident face at one side of the light guide plate and is projected out of a light emergence face of the light guide plate, after being reflected and diffused, to pass through an optic film assembly so as to form a planar light source for the liquid crystal panel.

The LGP is one of the important components of a liquid crystal display and is often made of poly(methyl methacrylate) (PMMA), which is also referred to as "organic glass" and has the property of thermal expansion. When a liquid crystal display is operating in a high temperature, the LGP gets expanded; and for operation in a low temperature, the LGP contracts. The size difference between expanding and contracting might as large as millimeters. On the other hand, positional accuracy between the LGP and the backlight source affects, to a great extent, the image style of the liquid crystal display.

FIG. 1 is an exploded view showing a conventional liquid crystal display device and FIG. 2 is a top plan view showing a backlight module of the conventional liquid crystal display device. With reference to FIGS. 1 and 2, the conventional liquid crystal display device comprises a backlight module 10 that is composed of a backplane 100, a light-emitting diode (LED) light bar 200, a light guide plate 300, and an optic film assembly 400, a mold frame 500 arranged on the backlight module 10, a liquid crystal panel 600 arranged on the mold frame 500, and a bezel 700 arranged on the liquid crystal panel 600. The light guide plate 300 comprises positioning posts 800 arranged adjacent to a light-entrance side of the LED light bar 200 to maintain a light coupling distance between the light guide plate 300 and the LED light bar 200, while elastic positioning blocks 900 are arranged at the side of the light guide plate 300 that is distant from the LED light bar 200 to achieve positioning.

As shown in FIG. 3, in a normal temperature, a proper gap is present between the side of the light guide plate 300 that is distant from the LED light bar 200 and the positioning blocks 900 to facilitate assembly and accommodate manufacturing tolerances.

As shown in FIG. 4, when the liquid crystal display device is in a high temperature, the light guide plate 300 that is heated and thus expanded gets into contact with the positioning blocks 900. Since the positioning blocks 900 are made of a solid elastic material and thus possess elasticity, they can absorb the increased size of the light guide plate 300 caused by expansion so as to maintain stable and tight engagement between the light guide plate 300 and the positioning blocks 900.

However, as shown in FIG. 5, when the liquid crystal display device is in a low temperature, the light guide plate 300 is cooled and gets contracted so that the gap between the light guide plate 300 and the positioning blocks 900 is enlarged. Under this condition, the positioning blocks 900 do not provide the function of effective positioning so that the light guide plate 300 may readily separate and break due to actions caused by vibrations and impacts.

SUMMARY OF THE INVENTION

An object of the present invention is to provide a liquid crystal display device, which has light guide plate (LGP) positioning block that is adjustable with variation of the surrounding temperature so as to achieve effective positioning of an LGP, thereby providing the liquid crystal display device with high reliability and stable taste of displayed images.

Another object of the present invention is to provide a method for manufacturing an LGP positioning block of a liquid crystal display device, wherein an LGP positioning block manufactured with such a method is adjustable with variation of the surrounding temperature to achieve effective positioning of an LGP.

To achieve the above objects, the present invention provides a liquid crystal display device, which comprises a backlight module, a mold frame arranged on the backlight module, a liquid crystal panel arranged on the mold frame, and a bezel arranged on the liquid crystal panel;

wherein the backlight module comprises a backplane, a light-emitting diode (LED) light bar arranged in the backplane, a light guide plate (LPG) arranged in the backplane, an optic film assembly arranged on the light guide plate, and a positioning post and an LGP positioning block that position the light guide plate; and the LGP positioning block comprises a positioning block body and liquid hermetically sealed inside the positioning block body and the positioning block body possesses elasticity;

whereby in a low temperature, the liquid gets condensed and expanded to enlarge a size of the positioning block body to compensate size reduction of the light guide plate caused by cooling; and in a high temperature, the elasticity of the positioning block body absorbs size expansion of the light guide plate caused by heating.

The backplane comprises a bottom board and a side board perpendicularly connected to the bottom board, the LED light bar being mounted to the side board, the light guide plate comprising a light-entrance side and a non-light-entrance side distant from the light-entrance side, a light emission surface of the LED light bar opposing the light-entrance side of the light guide plate; and the positioning post is arranged at a location adjacent to the light-entrance side of the light guide plate to maintain a light coupling distance between the light guide plate and the LED light bar and the LGP positioning block is arranged on the bottom board between the side board and the LGP non-light-entrance side.

The number of the positioning post used is two and the two positioning posts are arranged adjacent to the light-entrance side of the light guide plate and are opposite to each other; and the number of the LGP positioning block used is two and the two LGP positioning blocks are arranged opposite to each other and respectively set at corners of the LGP non-light-entrance side.

The positioning block body comprises a sealing trough formed by recessing a surface thereof, a passageway in communication with the sealing trough and extending into the interior of the positioning block body, and a receiving compartment in communication with the passageway and formed in the interior of the positioning block body; and the liquid is filled in the receiving compartment and the passageway and the sealing trough seals the liquid.

The sealing trough receives sealing adhesive filled therein and the sealing adhesive seals the liquid.

The liquid comprises distilled water.

The positioning block body is made of a material of rubber.

The present invention also provides a method for manufacturing an LGP positioning block of a liquid crystal display device, which comprises the following steps:

(1) providing a positioning block body;
wherein the positioning block body possesses elasticity and comprises a sealing trough formed by recessing a surface thereof, a passageway in communication with the sealing trough and extending into the interior of the positioning block body, and a receiving compartment in communication with the passageway and formed in the interior of the positioning block body;
(2) providing liquid and filling the liquid in the passageway and the receiving compartment;
(3) applying sealing adhesive in the sealing trough; and
(4) leveling and solidifying the sealing adhesive so that the sealing adhesive seals the liquid in the positioning block body to thereby complete the manufacture of the LGP positioning block.

The liquid comprises distilled water.

The positioning block body is made of a material of rubber.

The present invention further provides a method for manufacturing an LGP positioning block of a liquid crystal display device, which comprises the following steps:

(1) providing a positioning block body;
wherein the positioning block body possesses elasticity and comprises a sealing trough formed by recessing a surface thereof, a passageway in communication with the sealing trough and extending into the interior of the positioning block body, and a receiving compartment in communication with the passageway and formed in the interior of the positioning block body;
(2) providing liquid and filling the liquid in the passageway and the receiving compartment;
(3) applying sealing adhesive in the sealing trough; and
(4) leveling and solidifying the sealing adhesive so that the sealing adhesive seals the liquid in the positioning block body to thereby complete the manufacture of the LGP positioning block;

wherein the liquid comprises distilled water; and wherein the positioning block body is made of a material of rubber.

The efficacy of the present invention is that the present invention provides a liquid crystal display device, which comprises an LGP positioning block that comprises an elastic positioning block body and liquid hermetically sealed in the interior of the positioning block body. In a low temperature, the liquid gets condensed and expanded so as to enlarge the size of the positioning block body to compensate the size reduction of the light guide plate due to contraction caused by cooling; and in a high temperature, the elasticity of the positioning block body absorbs the size expansion of the light guide plate caused by heating so as to achieve adjustability of the LGP positioning block with temperature variation and allow for effective positioning of the light guide plate, thereby providing the liquid crystal display device with high reliability and stable taste of displayed images. The present invention also provides a method for manufacturing an LGP positioning block of a liquid crystal display device, in which liquid is first filled into the interior of a positioning block body, followed by application and solidification of the sealing adhesive to hermetically seal the liquid in the interior of the positioning block bod. The LGP positioning block manufactured with such a method allows for adjustability with variation of the surrounding temperature to achieve effective positioning of the light guide plate.

BRIEF DESCRIPTION OF THE DRAWINGS

The technical solution, as well as other beneficial advantages, of the present invention will be apparent from the following detailed description of embodiments of the present invention, with reference to the attached drawing. In the drawing:

FIG. 8 is a top plan view showing a backlight module of the liquid crystal display device according to the present invention;

FIG. 9 is a flow chart illustrating a method for manufacturing a light guide plate positioning block of a liquid crystal display device according to the present invention;

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
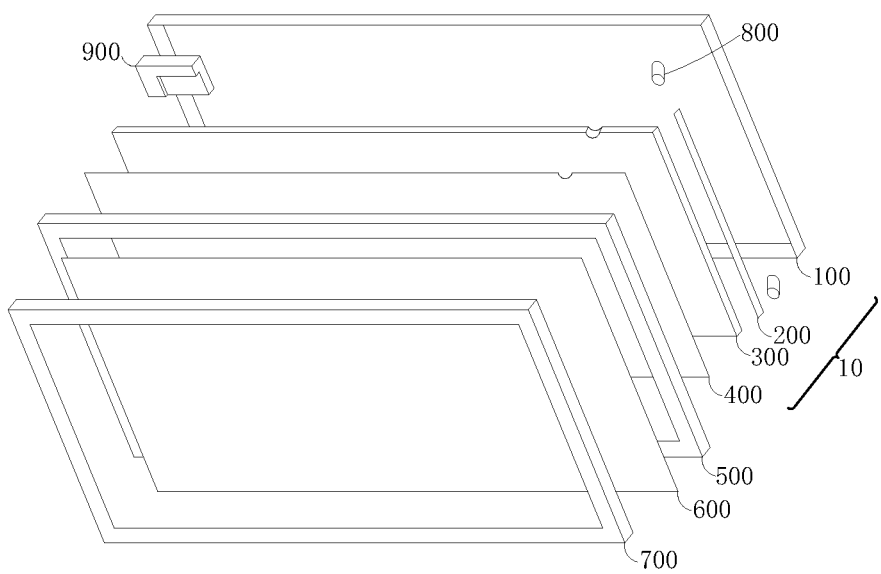
FIG. 1 is an exploded view of a conventional liquid crystal display device.
Figure 2:
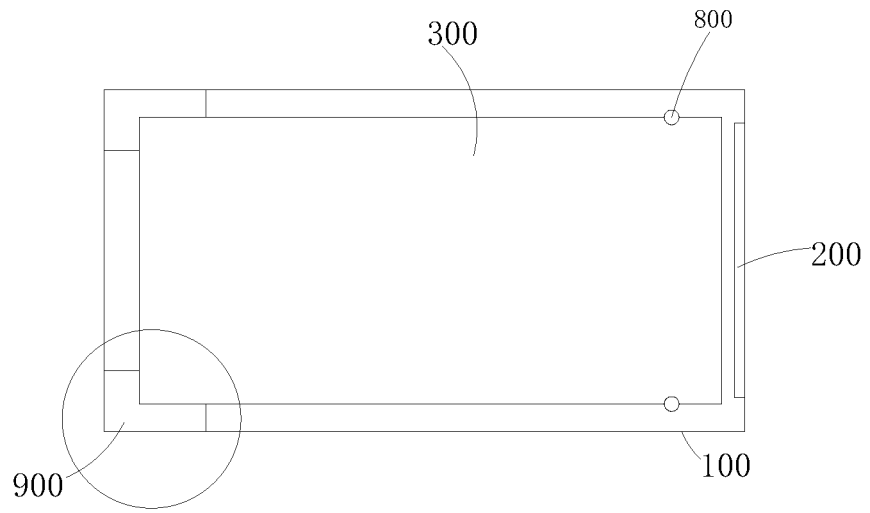
FIG. 2 is a top plan view of a backlight module of the conventional liquid crystal display device.
Figure 3:
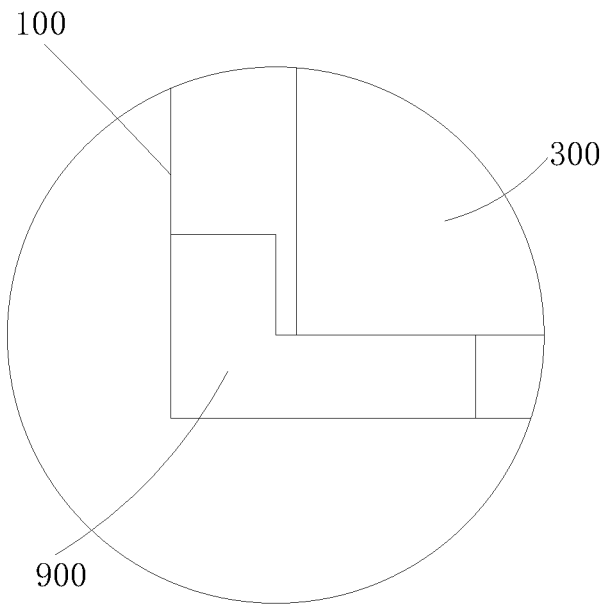
FIG. 3 is an enlarged view showing an engagement site between a light guide plate and a positioning block of FIG. 2 in a normal temperature.
Figure 4:
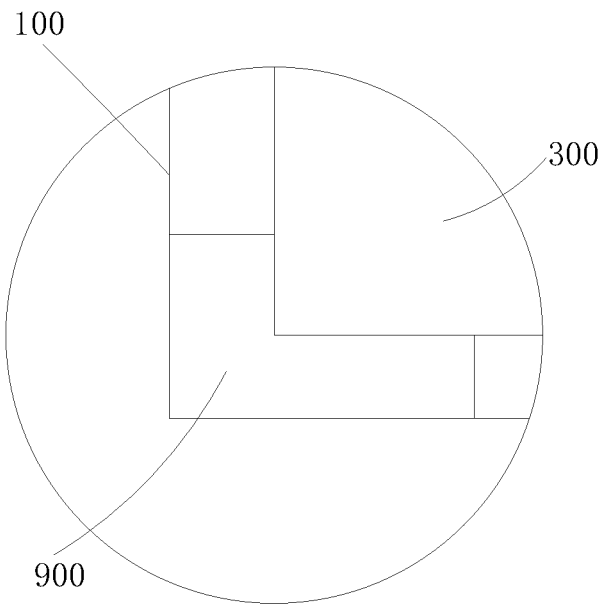
FIG. 4 is an enlarged view showing the engagement site between the light guide plate and the positioning block of FIG. 2 in a high temperature.
Figure 5:
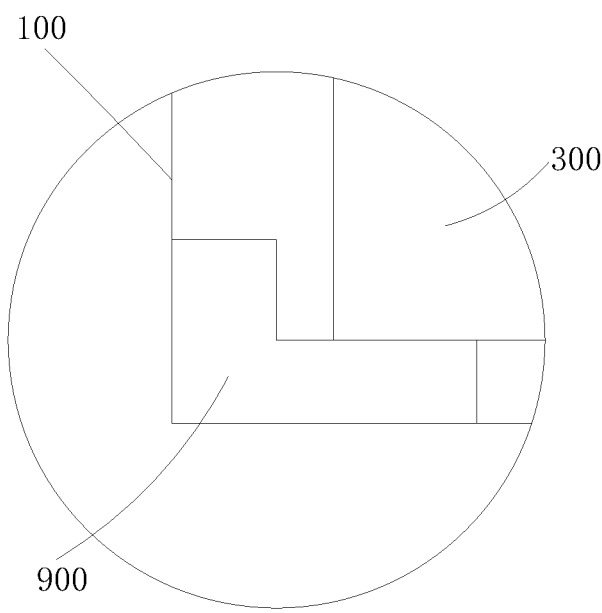
FIG. 5 is an enlarged view showing the engagement site between the light guide plate and the positioning block of FIG. 2 in a low temperature.
Figure 6:
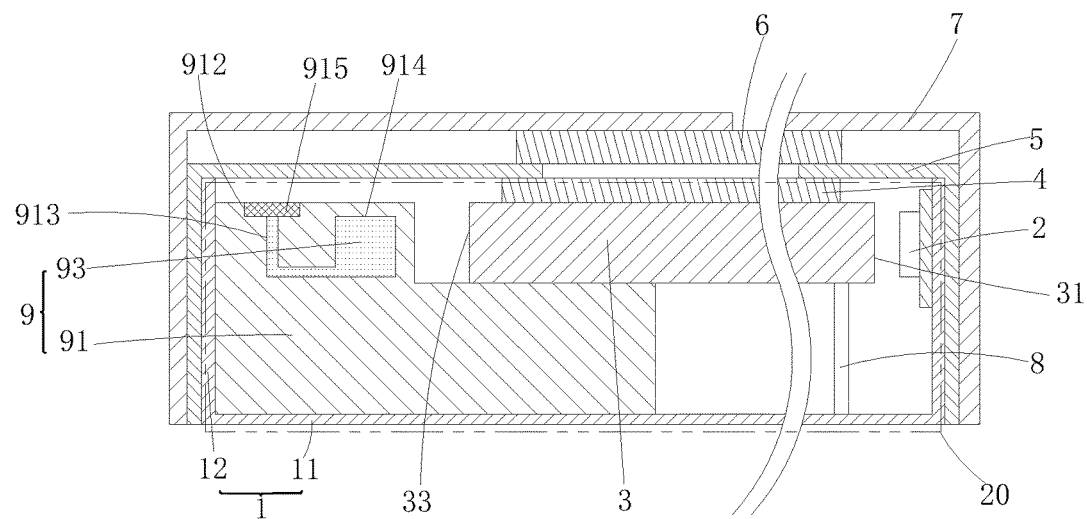
FIG. 6 is a cross-sectional view showing the structure of a liquid crystal display device according to the present invention in a normal temperature.
Figure 7:
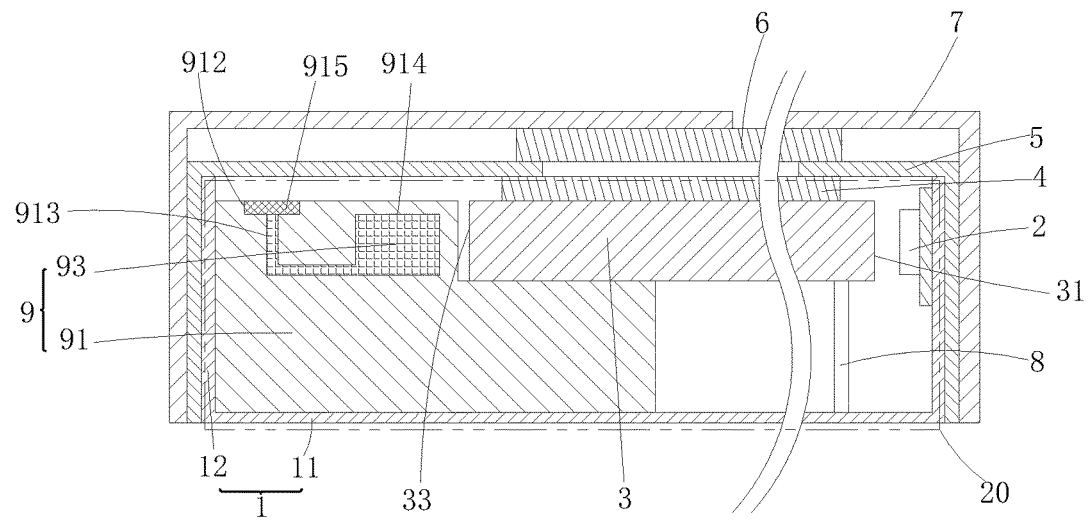
FIG. 7 is a cross-sectional view showing the structure of the liquid crystal display device according to the present invention in a low temperature.

Referring collectively to FIGS. 6-8, firstly, the present invention provides a liquid crystal display device. The liquid crystal display device comprises a backlight module 20, a mold frame 5 arranged on the backlight module 20, a liquid crystal panel 6 arranged on the mold frame 5, and a bezel 7 arranged on the liquid crystal panel 6.

The backlight module 20 comprises a backplane 1, a light-emitting diode (LED) light bar 2 arranged in the backplane 1, a light guide plate (LPG) 3 arranged in the backplane 1, an optic film assembly 4 arranged on the light guide plate 3, and a positioning post 8 and an LGP positioning block 9 that position the light guide plate 3.

Further, the LGP positioning block 9 comprises a positioning block body 91 and liquid 93 hermetically sealed inside the positioning block body 91. The positioning block body 91 is made of an elastic material, such as rubber, so that the positioning block body 91 possesses elasticity. The liquid 93 has the characteristics of being condensed when cooled down and thus increasing the volume thereof, and preferably, the liquid 93 is distilled water. Specifically, the positioning block body 91 comprises a sealing trough 912 formed by recessing a top surface thereof, a passageway 913 in communication with the sealing trough 912 and extending into the interior of the positioning block body 91, and a receiving compartment 914 in communication with the passageway 913 and formed in the interior of the positioning block body 91. The liquid 93 is filled in the receiving compartment 914 and the passageway 913, while the sealing trough 912 is filled with sealing adhesive 915 so that the liquid 93 is sealed by the sealing adhesive 915.

The backplane 1 comprises a bottom board 11 and a side board 12 perpendicularly connected to the bottom board 11. The LED light bar 2 is mounted to the side board 12. The light guide plate 3 comprises a light-entrance side 31 and a non-light-entrance side 33 distant from the light-entrance side 31. A light emission surface of the LED light bar 2 is opposing the light-entrance side 31 of the light guide plate 3.

The positioning post 8 is arranged at a location adjacent to the light-entrance side 31 of the light guide plate 3 to maintain a light coupling distance between the light guide plate 3 and the LED light bar 2. The LGP positioning block 9 is arranged on the bottom board 11 between the side board 12 and the LGP non-light-entrance side 33. Specifically, as shown in FIG. 8, the number of the positioning post 8 used is two and the two positioning posts 8 are arranged adjacent to the light-entrance side 31 of the light guide plate 3 and are opposite to each other. The number of the LGP positioning block 9 used is two and the two LGP positioning blocks 9 are arranged opposite to each other and respectively set at corners of the LGP non-light-entrance side 33.

As shown in FIG. 6, when the liquid crystal display device is in a normal temperature of around 25° C., a gap is present between the LGP positioning block 9 and the light guide plate 3 to facilitate assembly and to accommodate manufacturing tolerance. As shown in FIG. 7, in a low temperature lower than 0° C. down to −20° C., the liquid 93 is cooled and condensed and thus expanded so that the volume thereof is increased, whereby the size of the positioning block body 91 is enlarged to compensate the reduction of the size of the light guide plate 3 due to contraction caused by cooling. In a temperature higher than 50° C., such as a high temperature of 60° C., the liquid 93 may have very little expansion so that the elasticity of the positioning block body 91 may be sufficient to absorb the size expansion of the light guide plate 3 caused by heating. Thus, adjustability of the LGP positioning block 9 with temperature variation can be achieved to provide effective positioning of the light guide plate 3, thereby achieving high reliability of the liquid crystal display device and stable taste of displayed image.

Figure 10:
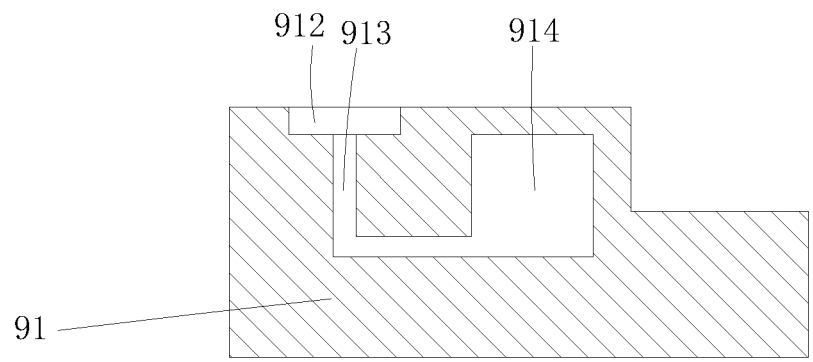
FIG. 10 is a schematic view illustrating step 1 of the method for manufacturing a light guide plate positioning block of a liquid crystal display device according to the present invention.

Referring to FIGS. 9-13, the present invention also provides a method for manufacturing the above-described LGP positioning block of the liquid crystal display device, which comprises the following steps:

Step 1: as shown in FIG. 10, providing a positioning block body 91.

The positioning block body 91 is made of an elastic material, such as rubber, so that the positioning block body 91 possesses elasticity. Specifically, the positioning block body 91 comprises a sealing trough 912 formed by recessing a top surface thereof, a passageway 913 in communication with the sealing trough 912 and extending into the interior of the positioning block body 91, and a receiving compartment 914 in communication with the passageway 913 and formed in the interior of the positioning block body 91.

Figure 11:
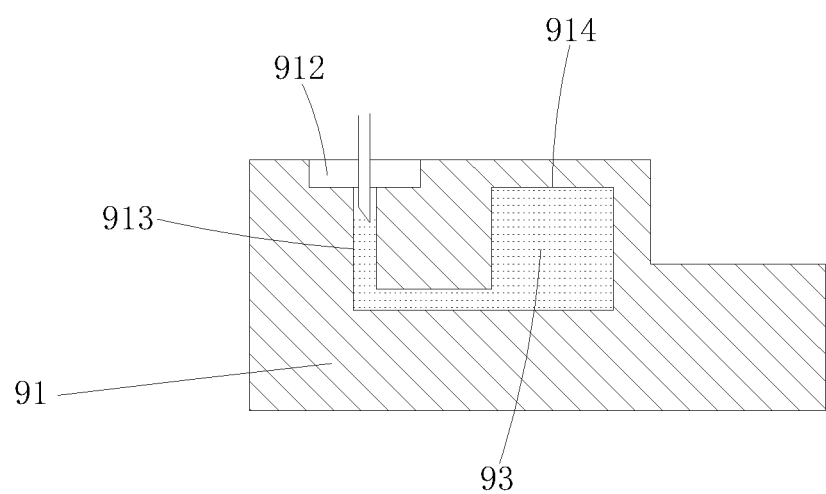
FIG. 11 is a schematic view illustrating step 2 of the method for manufacturing a light guide plate positioning block of a liquid crystal display device according to the present invention.

Step 2: as shown in FIG. 11, providing liquid 93 and filling the liquid 93 in the passageway 913 and the receiving compartment 914.

The liquid 93 has the characteristics of being condensed when cooled down and thus increasing the volume thereof, and preferably, the liquid 93 is distilled water.

Figure 12:
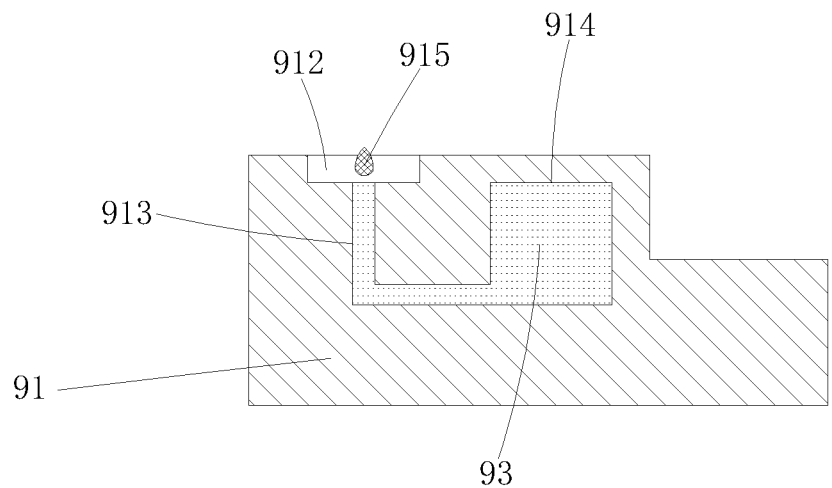
FIG. 12 is a schematic view illustrating step 3 of the method for manufacturing a light guide plate positioning block of a liquid crystal display device according to the present invention.

Step 3: as shown in FIG. 12, applying sealing adhesive 915 in the sealing trough 912.

Figure 13:
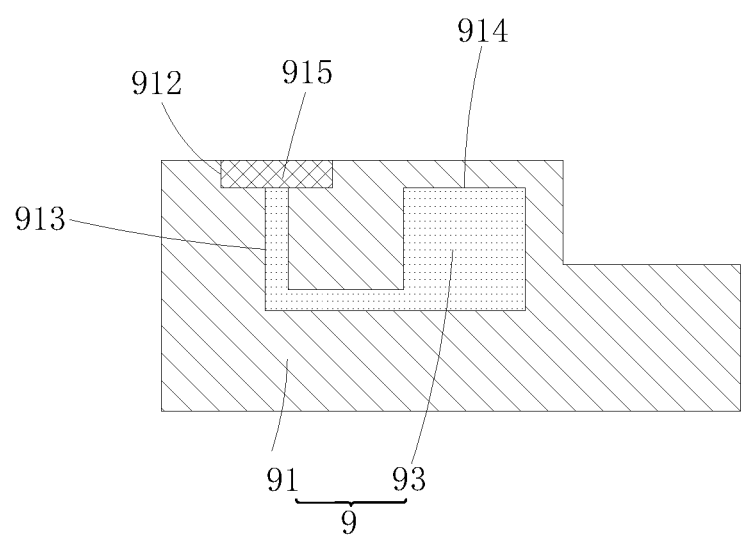
FIG. 13 is a schematic view illustrating step 4 of the method for manufacturing a light guide plate positioning block of a liquid crystal display device according to the present invention.

Step 4: as shown in FIG. 13, leveling and solidifying the sealing adhesive 915 so that the sealing adhesive 915 seals the liquid 93 in the positioning block body 91 to thereby complete the manufacture of the LGP positioning block 9.

In the method for manufacturing above-described LGP positioning block of liquid crystal display device, the liquid 93 is first filled in the interior of the positioning block body 91, followed by application and solidification of the sealing adhesive 915 to seal the liquid 93 in the interior of the positioning block body 91. The LGP positioning block 9 manufactured with such a method is characterized in that in a low temperature, the liquid 93 is cooled down, condensed, and expanded so that the volume thereof is increased, making the size of the positioning block body 91 enlarged to compensate the size reduction of the light guide plate due to contraction caused by cooling; in a high temperature, the elasticity of the positioning block body 91 absorbs the size expansion of the light guide plate caused by heating so as to achieve adjustability of the LGP positioning block 9 with temperature variation and allow for effective positioning of the light guide plate 3.

In summary, the present invention provides a liquid crystal display device, which comprises an LGP positioning block that comprises an elastic positioning block body and liquid hermetically sealed in the interior of the positioning block body. In a low temperature, the liquid gets condensed and expanded so as to enlarge the size of the positioning block body to compensate the size reduction of the light guide plate due to contraction caused by cooling; and in a high temperature, the elasticity of the positioning block body absorbs the size expansion of the light guide plate caused by heating so as to achieve adjustability of the LGP positioning block with temperature variation and allow for effective positioning of the light guide plate, thereby providing the liquid crystal display device with high reliability and stable taste of displayed images. The present invention also provides a method for manufacturing an LGP positioning block of a liquid crystal display device, in which liquid is first filled into the interior of a positioning block body, followed by application and solidification of the sealing adhesive to hermetically seal the liquid in the interior of the positioning block bod. The LGP positioning block manufactured with such a method allows for adjustability with variation of the surrounding temperature to achieve effective positioning of the light guide plate.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A method for manufacturing a light guide plate (LGP) positioning block of a liquid crystal display device, comprising the following steps:
   (1) providing a positioning block body;
   wherein the positioning block body possesses elasticity and comprises a sealing trough formed by recessing a surface thereof, a passageway in communication with the sealing trough and extending into an interior of the positioning block body, and a receiving compartment in communication with the passageway and formed in the interior of the positioning block body;
   (2) providing a liquid and filling the liquid in the passageway and the receiving compartment;
   wherein the liquid has a volume that is expandable with a drop of temperature thereof to enlarge a size of the positioning block body through the elasticity of the positioning block body;
   (3) applying sealing adhesive in the sealing trough; and
   (4) leveling and solidifying the sealing adhesive so that the sealing adhesive seals the liquid in the positioning block body to thereby complete the manufacture of the LGP positioning block.

2. The method as claimed in claim 1, wherein the liquid comprises distilled water.

3. The method as claimed in claim 2, wherein the liquid comprising distilled water freezes and expand in a temperature lower than zero degrees Celsius so as to enlarge the size of the positioning block body.

4. The method as claimed in claim 1, wherein the positioning block body is made of a material of rubber.

5. The method as claimed in claim 4, wherein the liquid comprises distilled water.

6. The method as claimed in claim 5, wherein the liquid comprising distilled water freezes and expand in a temperature lower than zero degrees Celsius so as to enlarge the size of the positioning block body.

7. A method for manufacturing a light guide plate (LGP) positioning block of a liquid crystal display device, comprising the following steps:
   (1) providing a positioning block body;
   wherein the positioning block body possesses elasticity and comprises a sealing trough formed by recessing a surface thereof, a passageway in communication with the sealing trough and extending into an interior of the positioning block body, and a receiving compartment in communication with the passageway and formed in the interior of the positioning block body;
   (2) providing liquid and filling the liquid in the passageway and the receiving compartment;
   wherein the liquid has a volume that is expandable with a drop of temperature thereof to enlarge a size of the positioning block body through the elasticity of the positioning block body;
   (3) applying sealing adhesive in the sealing trough; and
   (4) leveling and solidifying the sealing adhesive so that the sealing adhesive seals the liquid in the positioning block body to thereby complete the manufacture of the LGP positioning block;
   wherein the liquid comprises distilled water; and
   wherein the positioning block body is made of a material of rubber.

8. The method as claimed in claim 7, wherein the liquid comprising distilled water freezes and expand in a temperature lower than zero degrees Celsius so as to enlarge the size of the positioning block body through the elasticity of the material of rubber that makes the positioning block body.

* * * * *